(12) United States Patent
Soya et al.

(10) Patent No.: US 8,436,924 B2
(45) Date of Patent: May 7, 2013

(54) METHOD OF DRIVING AN IMAGE SENSOR, AND AN IMAGE PICKUP APPARATUS

(75) Inventors: Hideki Soya, Kyoto (JP); Yasushi Kondo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 256 days.

(21) Appl. No.: 12/808,093

(22) PCT Filed: Dec. 16, 2008

(86) PCT No.: PCT/JP2008/072869
§ 371 (c)(1),
(2), (4) Date: Jun. 14, 2010

(87) PCT Pub. No.: WO2009/078408
PCT Pub. Date: Jun. 25, 2009

(65) Prior Publication Data
US 2010/0265377 A1    Oct. 21, 2010

(30) Foreign Application Priority Data

Dec. 17, 2007   (JP) ................................. 2007-324409

(51) Int. Cl.
*H04N 9/64*      (2006.01)
*H04N 3/14*      (2006.01)
*H04N 5/335*     (2006.01)

(52) U.S. Cl.
USPC ............................ 348/243; 348/296; 348/312

(58) Field of Classification Search ............... 348/222.1, 348/241, 243, 244, 296, 302, 311, 312
See application file for complete search history.

(56) References Cited

U.S. PATENT DOCUMENTS

| | | | | |
|---|---|---|---|---|
| 6,127,684 | A * | 10/2000 | Kaifu | 250/370.09 |
| 6,271,880 | B1 * | 8/2001 | Kameshima et al. | 348/244 |
| 6,448,561 | B1 * | 9/2002 | Kaifu | 250/370.09 |
| 6,972,795 | B1 | 12/2005 | Etoh et al. | |
| 7,626,628 | B2 * | 12/2009 | Muraoka et al. | 348/308 |
| 2007/0051976 | A1 * | 3/2007 | Moody et al. | 257/186 |
| 2007/0176109 | A1 * | 8/2007 | Bell | 250/370.09 |
| 2007/0291147 | A1 * | 12/2007 | Muraoka et al. | 348/308 |

FOREIGN PATENT DOCUMENTS

| | | |
|---|---|---|
| JP | 6-14253 A | 1/1994 |
| JP | 2000-165750 A | 6/2000 |
| JP | 2001-345441 A | 12/2001 |
| JP | 2003-279843 A | 10/2003 |
| JP | 2004-15612 A | 1/2004 |

OTHER PUBLICATIONS

Notification of Reasons for Refusal for the Application No. 2007-324409 from Japan Patent Office mailed Sep. 20, 2011.

(Continued)

*Primary Examiner* — Nicholas Giles
(74) *Attorney, Agent, or Firm* — Cheng Law Group, PLLC (57) ABSTRACT

When an external trigger is received as a predetermined signal after receiving a signal concerning a start of imaging, controls are carried out to stop driving of a CCD type solid-state image sensor (CCD) from receipt of the signal concerning a start of imaging until receipt of the external trigger, and to start the driving of the CCD synchronously with the receipt of the external trigger. Thus, the driving of the CCD is not started immediately upon receipt of the signal concerning a start of imaging, and the driving time of the CCD can be shortened by the time from receipt of the signal concerning a start of imaging until receipt of the external trigger, thereby suppressing heat generation of the CCD.

10 Claims, 9 Drawing Sheets

OTHER PUBLICATIONS

Kondo, Yasushi et al., "Development of 'HyperVision HPV-1' High-speed Video Camera", *Shimadzu Hyoron* [Shimadu Review], 2005, vol. 62, No. 1-2, pp. 79-86.

Kondo, Yasushi et al., "Development of 'HyperVision HPV-1' High-speed Video Camera", *Shimadzu Hyoron* [Shimadzu Review], 2005, vol. 62, No. 1-2, pp. 79-86.

* cited by examiner

METHOD OF DRIVING AN IMAGE SENSOR, AND AN IMAGE PICKUP APPARATUS

TECHNICAL FIELD

This invention relates to a method of driving an image sensor, and an image pickup apparatus, for picking up images by converting incident light into electric charges to generate signal charges corresponding to the intensity of the light.

BACKGROUND ART

As this type of image sensor, there exists a CCD (Charge Coupled Device) type solid-state image sensor, for example. In recent years, in order to enable high-speed imaging, such a CCD type solid-state image sensor (hereinafter abbreviated as "CCD") has been constructed capable of a short photographic cycle (e.g. 100 µs or less) such as high-speed imaging. At a moment of occurrence of a certain event showing a change in a photographic subject such as bursting of a balloon, collision of an iron ball or a stimulus to microorganisms, since the change in the event is rapid, it is possible to pick up images of the rapid change in the event in detail by using such high-speed imaging.

However, since the number of frames is limited, the photographic cycle is controlled to be short for a scene of interest on the basis of the occurrence of an event (see Patent Document 1, for example). It is desirable to pick up, before the occurrence of an event, images of a state before the change in the event. Then, images are picked up by controlling the photographic cycle to be long before the occurrence of the event, and the photographic cycle is controlled to be short after the occurrence of the event.

Incidentally, the driving of a CCD in high-speed imaging is divided broadly into a driving called "internal photography" and a driving called "external photography". The driving of the CCD is started synchronously with an external signal taken in with the above occurrence of an event serving as external trigger, or an external signal generated by depression of an imaging button. In the above "internal photography", control is performed to stop the driving of the CCD after picking up data for a predetermined number of frames (e.g. 100 frames) from a start of driving of the CCD. Conversely, in the above "external photography", when an external signal is received after a start of driving of the CCD, control is performed to stop the driving of the CCD synchronously therewith.

In order to realize the high-speed imaging noted above, a conventional, ordinary image sensor of the CCD type or CMOS type cannot cope with a high-speed imaging having a photographing rate at $1.0 \times 10^6$ frames per second (1,000,000 frames per second), and therefore an image sensor of a special structure called "in-situ storage image sensor" is used (see Patent Document 2 and Nonpatent Document 1, for example).

Figure 2:
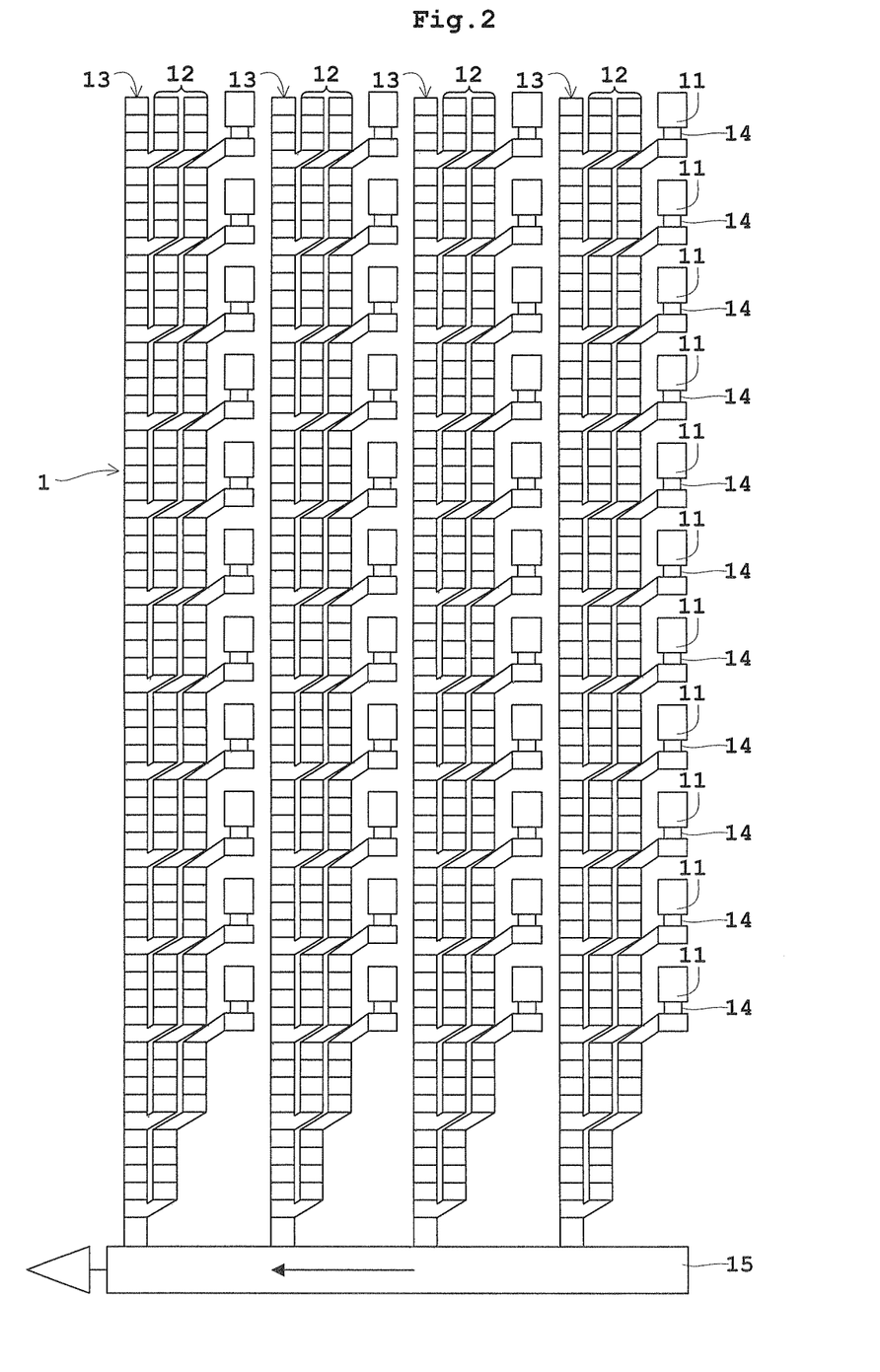
FIG. 2 is a block diagram showing a construction of a CCD according to each embodiment.

The in-situ storage image sensor (IS-CCD: Image Storage-CCD), as shown in FIG. 2, includes, for each photodiode 11, storage CCDs 12 and vertical transfer CCDs 13 for predetermined frames (e.g. 100 frames). Signal charges generated from the photodiodes 11 during image pickup are stored while being successively transferred to the storage CCDs 12, and further to the vertical transfer CCDs 13. And images are acquired by successively transferring the signal charges for a predetermined number of frames stored in the storage CCDs 12 and vertical transfer CCDs 13 to a horizontal transfer CCD 15 for reading. Signal charges having exceeded the predetermined frames during the image pickup are discarded, and the latest signal charges for the predetermined frames are always stored in the storage CCDs 12 and vertical transfer CCDs 13. Therefore, when the transfer of the signal charges in the storage CCDs 12 and vertical transfer CCDs 13 is stopped at the end of the imaging, images corresponding to the predetermined number of the latest frames are obtained from the time going back by the predetermined frames in time from the end point of time.

[Patent Document 1]
Unexamined Patent Publication No. 2004-15612 (pages 1-16, FIGS. 1-10)
[Patent Document 2]
Unexamined Patent Publication No. 2001-345441
[Nonpatent Document 1]
Kondo and five others, "Development of "HyperVision HPV-1" High-speed Video Camera", Shimadzu Review, Shimadzu Review Editorial Department, published Sep. 30, 2005, Vol. 62, No. 1.2, p. 79-86

DISCLOSURE OF THE INVENTION

Problem to be Solved by the Invention

However, in the case of "external photography" noted above, unless an external signal is received, the driving of the image sensor represented by a CCD is continued. When the photographic cycle is 1 µs as in the high-speed imaging with a photographing rate at $1.0 \times 10^6$ frames per second (1,000,000 frames per second), the image sensor will generate heat. Then, for device protection, when an external signal is not received within a predetermined time, and when device temperature has risen to a predetermined temperature, the driving of the image sensor is stopped to discontinue the imaging. When the driving of the image sensor is stopped in this way, there will arise a situation where the imaging is discontinued by the stopping of the driving of the image sensor although continuation of the image pickup is desired.

The image sensor itself may be destroyed by heat generation. In order to prevent such destruction, it is also possible to limit a continuation time (high-speed imaging permissible time) for carrying out high-speed imaging, apart from the above stopping of the driving of the image sensor. When the photographic cycle for a scene of interest is controlled to be short on the basis of the occurrence of an event noted above, it is necessary to wait for a target event to occur, and such standby state may be prolonged depending on circumstances. When a standby is made in the state of the above high-speed imaging mode in such a case, the high-speed imaging permissible time will elapse in the meantime, giving rise also to a problem that the imaging standby state will be canceled automatically.

This invention is has been made having regard to the state of the art noted above, and its object is to provide a method of driving an image sensor, and an image pickup apparatus, which can suppress heat generation of the image sensor.

Means for Solving the Problem

To fulfill the above object, this invention provides the following construction.

A method of driving an image sensor of this invention is a method of driving an image sensor having a photoelectric conversion device for converting incident light into electric charges, thereby to generate signal charges corresponding to intensity of the light, and a plurality of charge storage devices for accumulating and storing the signal charges generated from the photoelectric conversion device, imaging being carried out by causing the photoelectric conversion device to generate the signal charges, and successively transferring, while storing, the signal charges from the charge storage devices to adjacent charge storage devices, wherein, when a predetermined signal is received after receiving a signal concerning a start of imaging, control is carried out to maintain driving of the image sensor in an idling state from receipt of the signal concerning a start of imaging until receipt of the predetermined signal, and control is carried out to cancel the idling state of the image sensor synchronously with the receipt of the predetermined signal.

According to the method of driving the image sensor of this invention, when imaging is carried out with the image sensor having a plurality of charge storage devices, the imaging can be carried out with a short photographic cycle, but the image sensor will generate heat easily. Then, when the predetermined signal is received after receipt of the signal concerning a start of imaging, control is carried out to maintain the driving of the image sensor in an idling state from receipt of the signal concerning a start of imaging until receipt of the predetermined signal, and control is carried out to cancel the idling state of the image sensor synchronously with the receipt of the predetermined signal. Thus, instead of canceling the idling state of the image sensor immediately after receipt of the signal concerning a start of imaging, the cancellation of the idling state of the image sensor is delayed by the time from receipt of the signal concerning a start of imaging to receipt of the predetermined signal. Therefore, the driving time of the image sensor can be shortened by the time from receipt of the signal concerning a start of imaging to receipt of the predetermined signal, thereby suppressing heat generation of the image sensor. This invention is useful in "external photography" which stops the driving of the image sensor after receipt of an external signal. The external signal concerning stopping of the imaging may be received after receipt of the predetermined signal noted above.

An image pickup apparatus of this invention is an image pickup apparatus comprising an image sensor having a photoelectric conversion device for converting incident light into electric charges, thereby to generate signal charges corresponding to intensity of the light, and a plurality of charge storage devices for accumulating and storing the signal charges generated from the photoelectric conversion device, imaging being carried out by causing the photoelectric conversion device to generate the signal charges, and successively transferring, while storing, the signal charges from the charge storage devices to adjacent charge storage devices; and an image sensor control device for controlling driving of the image sensor; wherein the image sensor control device is arranged, when a predetermined signal is received after receiving a signal concerning a start of imaging, to carry out control to maintain driving of the image sensor in an idling state from receipt of the signal concerning a start of imaging until receipt of the predetermined signal, and to carry out control to cancel the idling state of the image sensor synchronously with the receipt of the predetermined signal.

According to the image pickup apparatus of this invention, when the predetermined signal is received after receipt of the signal concerning a start of imaging, the image sensor control device carries out control to maintain the driving of the image sensor in an idling state from receipt of the signal concerning a start of imaging until receipt of the predetermined signal, and carries out control to cancel the idling state of the image sensor synchronously with the receipt of the predetermined signal. Thus, the idling state of the image sensor is not canceled immediately after receipt of the signal concerning a start of imaging, and the driving time of the image sensor can be shortened by the time from receipt of the signal concerning a start of imaging to receipt of the predetermined signal, thereby suppressing heat generation of the image sensor.

In these inventions noted above, one example of the above the idling state is to stop the driving of the image sensor, and one example of the cancellation of the idling state is to start the driving of the image sensor. In this case, controls are carried out to stop the driving of the image sensor from receipt of the signal concerning a start of imaging until receipt of the predetermined signal, and to start the driving of the image sensor synchronously with the receipt of the predetermined signal. With such controls, instead of starting the driving of the image sensor immediately upon receipt of the signal concerning a start of imaging, the start of the driving of the image sensor is delayed by the time from receipt of the signal concerning a start of imaging until receipt of the predetermined signal. Therefore, the driving time of the image sensor can be shortened by the time from receipt of the signal concerning a start of imaging until receipt of the predetermined signal, thereby suppressing heat generation of the image sensor.

In the invention where one example of the above the idling state is to stop the driving of the image sensor, and one example of the cancellation of the idling state is to start the driving of the image sensor, it is preferred that the image sensor is reset periodically during stopping of the driving of the image sensor from receipt of the signal concerning a start of imaging until receipt of the predetermined signal. Even if the driving of the image sensor is stopped, signal charges are generated, to generate noise, by dark current, previous driving of the image sensor and so on. Then, noise can be reduced by carrying out resetting periodically to discharge the noise such as of signal charges.

Another example of the above the idling state is to set the driving of the image sensor to a low speed, and another example of the cancellation of the idling state is to set the driving of the image sensor to a higher speed than the low speed. In this case, controls are carried out to set the driving of the image sensor to the low speed from receipt of the signal concerning a start of imaging until receipt of the predetermined signal, and to set the driving of the image sensor to the higher speed synchronously with the receipt of the predetermined signal. With such controls, instead of setting the driving of the image sensor to the high speed immediately upon receipt of the signal concerning a start of imaging, the high speed for the driving of the image sensor is delayed by the time from receipt of the signal concerning a start of imaging until receipt of the predetermined signal. Although drive current is supplied to the image sensor at the time of low speed in the idling state, since it is low speed, the heat generation of the image sensor is considerably low compared with the time of imaging at high speed. Therefore, the driving time of the image sensor can be shortened by the time from receipt of the signal concerning a start of imaging until receipt of the predetermined signal, thereby suppressing the heat generation of the image sensor.

At the time of low speed, the photoelectric conversion operation by the photoelectric conversion device and the transfer operation of signal charges by the charge storage devices are repeatedly carried out. Therefore, noise due to dark current and the like is not accumulated. Images with an excellent signal to noise ratio can be obtained from an actual start of imaging (i.e. after receipt of the predetermined signal).

Effects of the Invention

With the method of driving the image sensor and the image pickup apparatus according to this invention, when a predetermined signal is received after receipt of a signal concerning a start of imaging, control is carried out to maintain the driving of the image sensor in an idling state from receipt of the signal concerning a start of imaging until receipt of the predetermined signal, and control is carried out to cancel the idling state of the image sensor synchronously with the receipt of the predetermined signal. Thus, the idling state of the image sensor is not canceled immediately after receipt of the signal concerning a start of imaging, and the driving time of the image sensor can be shortened by the time from receipt of the signal concerning a start of imaging to receipt of the predetermined signal, thereby suppressing heat generation of the image sensor.

DESCRIPTION OF REFERENCES

1 . . . CCD type solid-state image sensor (CCD)
9a . . . power source
9b . . . timing generator
11 . . . photodiodes
12 . . . storage CCDs

[Embodiment 1]

An embodiment of this invention will be described hereinafter with reference to the drawings.

Figure 1:
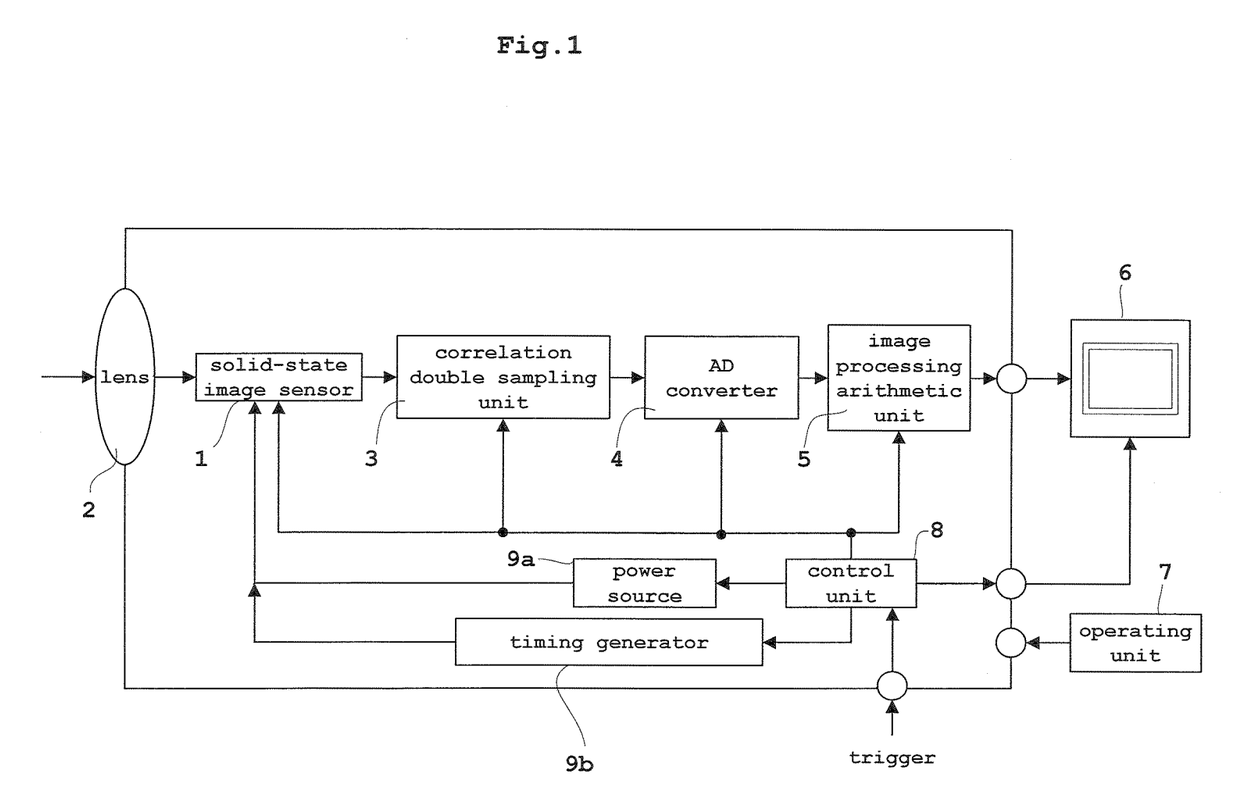
FIG. 1 is a block diagram showing an outline of an image pickup apparatus using a CCD type solid-state image sensor (CCD) according to Embodiment 1.

FIG. 1 is a block diagram showing an outline of an image pickup apparatus using a CCD type solid-state image sensor (CCD) according to Embodiment 1. FIG. 2 is a block diagram showing the construction of the CCD.

The image pickup apparatus according to Embodiment 1, including also Embodiment 2 to follow, is constructed to acquire optical images of a subject, convert the acquired optical images into signal charges and into electric signals, thereby picking up images of the subject. Specifically, as shown in FIG. 1, the image pickup apparatus includes a solid-state image sensor (CCD) 1, and includes a lens 2, a correlation double sampling unit 3, an AD converter 4, an image processing arithmetic unit 5, a monitor 6, an operating unit 7 and a control unit 8. Further, the image pickup apparatus includes a power source 9a and a timing generator 9b. This image pickup apparatus is used for high-speed imaging with a photographic rate at $1.0 \times 10^6$ frames per second (1,000,000 frames per second). The solid-state image sensor (CCD) 1 corresponds to the image sensor in this invention. The power source 9a and timing generator 9b correspond to the image sensor control device in this invention.

The lens 2 takes in optical images of the subject. The correlation double sampling unit 3 amplifies signal charges from the CCD 1 to low noise, and converts them into electric signals for output. The AD converter 4 converts the electric signals into digital signals. The image processing arithmetic unit 5 performs various types of arithmetic processing to create two-dimensional images of the subject based on the electric signals digitized by the AD converter 4. The monitor 6 outputs the two-dimensional images on a screen. The operating unit 7 performs various operations required for execution of imaging. The control unit 8 carries out overall control of the entire apparatus according to controls such as photographing conditions set by the operating unit 7.

The power source 9a applies voltage to read gates 14 (see FIG. 2) to be described hereinafter, and to transfer electrodes for transferring the signal charges within the CCD 1. The timing generator 9b generates timing of voltage application, timing of imaging, a clock and so on. Thus, with the timing generator 9b generating timing, clock and so on, and the power source 9a applying voltage to the transfer electrodes and so on, the power source 9a and timing generator 9b drive the CCD 1. Particularly, in this Embodiment 1, as shown in the timing chart of FIG. 3 to be described hereinafter, controls are carried out such that, when an external trigger is received after receipt of a signal concerning a start of imaging, driving of the CCD 1 is withheld from receipt of the above external trigger until receipt of the above signal concerning a start of imaging, and driving of the CCD 1 is started synchronously with receipt of the external trigger.

Next, as shown in FIG. 2, the CCD 1 includes photodiodes 11 for converting incident light (optical images of a subject) into electric charges to generate signal charges corresponding to the intensity of the light, a plurality of storage CCDs 12 for accumulating and storing the signal charges generated from the photodiodes 11, and vertical transfer CCDs 13 for transferring the signal charges in these storage CCDs 12 in a vertical direction shown in FIG. 2. The photodiodes 11 correspond to the photoelectric conversion device in this invention. The storage CCDs 12 correspond to the charge storage devices in this invention.

Each photodiode 11 has a read gate 14 disposed at a side thereof. Each read gate 14 reads signal charges from this photodiode 11 to a storage CCD 12 adjacent thereto.

The storage CCDs 12 are connected to form lines, respectively, and a plurality of lines of storage CCDs 12 are arranged. The signal charges generated from the photodiodes 11 are stored in the respective storage CCDs 12 while transferring them successively to the adjoining storage CCDs 12. And the signal charges successively transferred from the storage CCDs 12 are joined to the vertical transfer. CCDs 13. These signal charges successively transferred from the vertical transfer CCDs 13 are transferred to a horizontal transfer CCD 15.

The photodiodes 11 are arranged two-dimensionally. Since the photodiodes 11 are arranged horizontally and vertically parallel, the storage CCDs 12 in line form extend in an oblique direction. The CCD 1 according to this Embodiment 1, including also Embodiment 2 to follow, is what is called an "in-situ storage image sensor". The overall construction of CCD 1 is the same as in the prior art.

With the plurality of storage CCDs 12 provided as described above, imaging is carried out while successively storing and transferring signal charges from each storage CCD 12 to a storage CCD 12 adjacent thereto. Therefore, imaging can be carried out in a short photographic cycle even when the photographic cycle is as short as 1 μs as in high-speed imaging with a photographic rate at $1.0 \times 10^6$ frames per second (1,000,000 frames per second).

Figure 3:
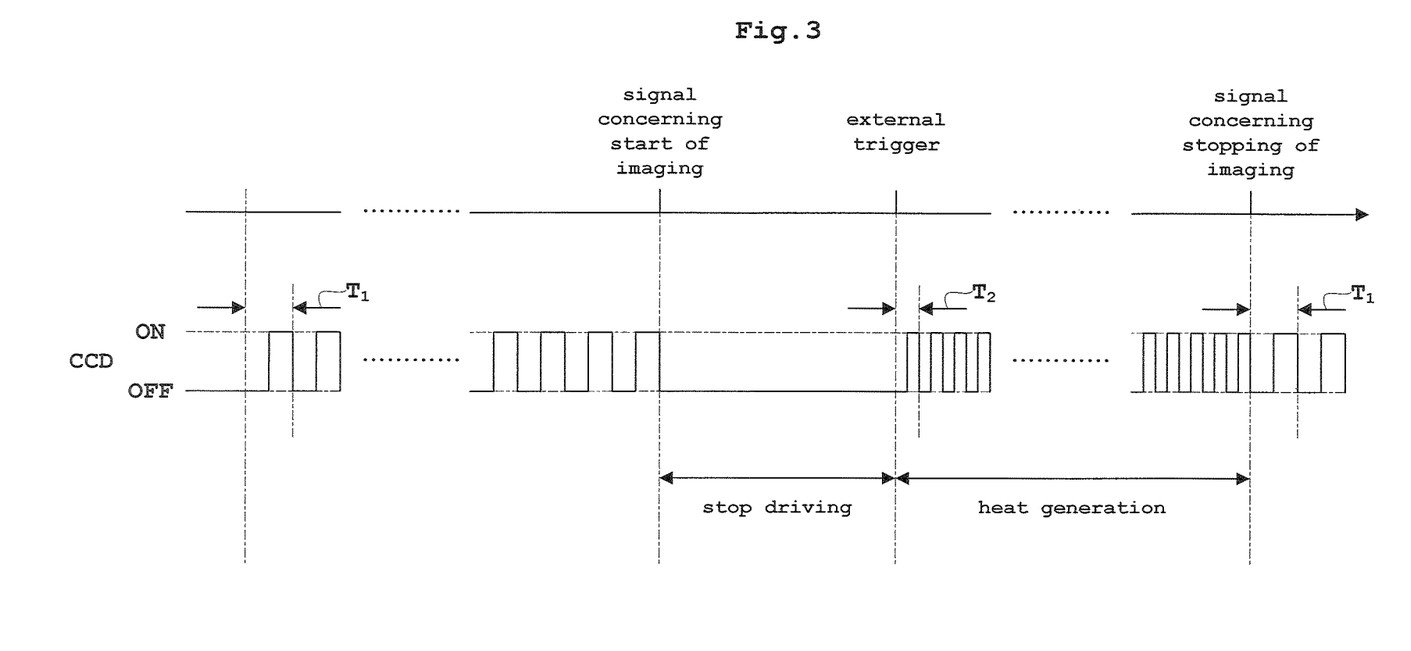
FIG. 3 is a timing chart concerning driving of the CCD according to Embodiment 1.

Next, a specific drive control of the CCD 1 will be described with reference to FIG. 3. FIG. 3 is s timing chart concerning driving of the CCD according to this Embodiment 1. Description will be made while comparing with FIG. 4 which is a timing chart concerning driving of a conventional CCD. Description will be made taking, as an example, imaging carried out conventionally and in this Embodiment 1 (FIG. 4, FIG. 3), with a photographic cycle $T_1$ (see FIGS. 3 and 4) set to 2.0 μs per frame (i.e. a photographic rate at $500 \times 10^3$ frames per second), until a signal concerning a start of imaging is received, in order to monitor, before occurrence of an event, a situation before a change in the event. Description will be made taking, as an example, imaging carried out with a photographic cycle $T_2$ (see FIGS. 3 and 4) shorter than the photographic cycle $T_1$ before the occurrence of the event, the photographic cycle $T_2$ being set to 1.0 μs per frame (i.e. a photographic rate at $1.0 \times 10^6$ frames per second, conventionally (FIG. 4), in order to image in detail a rapid change in the event after the occurrence of the event, after receipt of a signal concerning a start of imaging, and in this Embodiment 1 (FIG. 3) which detects the occurrence of an event as a trigger, in order to image in detail after receipt of that external trigger, a rapid change in the event after the occurrence of the event.

Conventionally, and in this Embodiment 1 also, the CCD 1 is driven with the photographic cycle $T_1$ at 2.0 μs per frame until a signal concerning a start of imaging is received, in order to monitor, before occurrence of an event, a situation before a change in the event, as noted above. A signal concerning a start of imaging is generated by depressing a photographing button, or a signal concerning a start of imaging is generated from a personal computer or the like present outside the image pickup apparatus. This signal is fed through the control unit 8 to the power source 9a and timing generator 9b.

Figure 4:
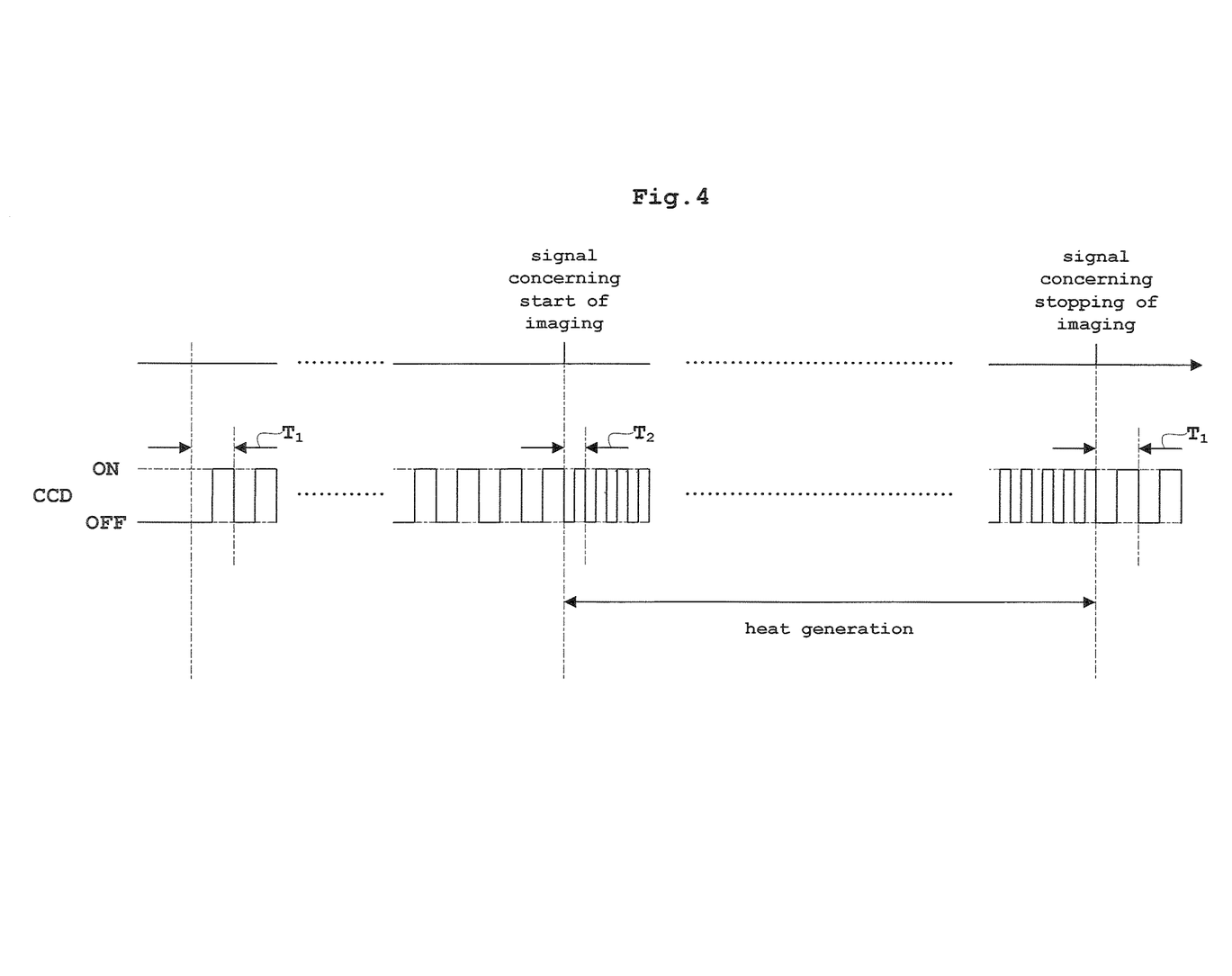
FIG. 4 is a timing chart concerning conventional driving of a CCD for comparison with FIG. 3.

Conventionally, as shown in FIG. 4, when a signal concerning a start of imaging is received, in synchronism with the signal, the timing generator 9b, with the synchronized timing, and the power source 9a, by applying voltage to the read gates 14 and transfer electrodes (not shown) of the CCD 1, start driving the CCD 1.

On the other hand, in this Embodiment 1, as shown in FIG. 3, when a signal concerning a start of imaging is received, in synchronism with the signal, the timing generator 9b, with the synchronized timing, and the power source 9a, by stopping the application of voltage to the read gates 14 and transfer electrodes (not shown) of the CCD 1, stop driving the CCD 1. The stopping of driving of the CCD 1 is continued until receipt of an external trigger from detection of the occurrence of an event. The external trigger corresponds to the predetermined signal in this invention.

Figure 5:
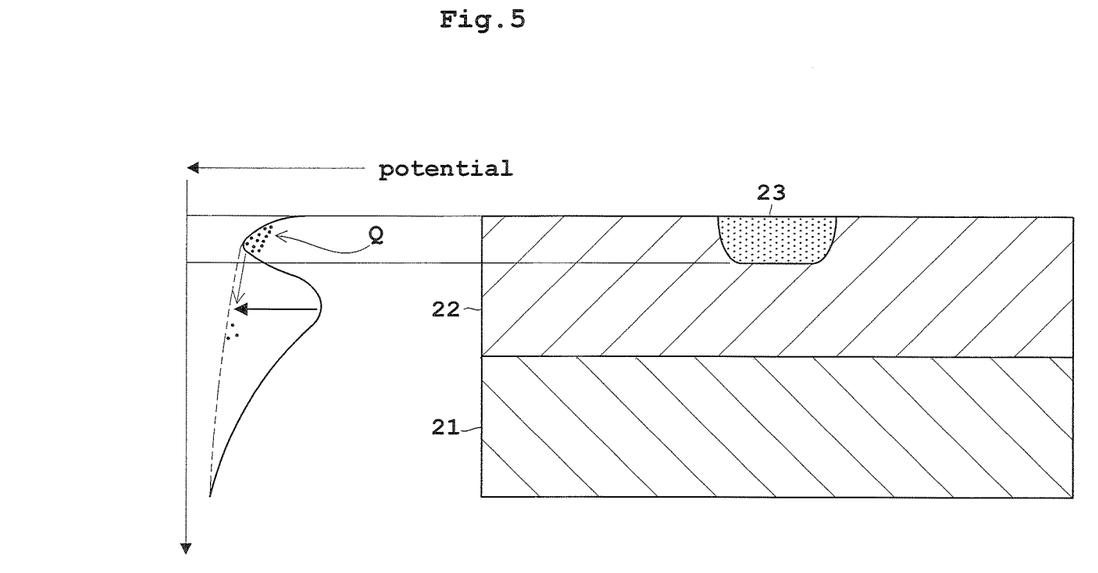
FIG. 5 is a diagrammatic view of a potential and a CCD substrate, schematically showing a discharge of signal charges for resetting the CCD.

Instead, in this Embodiment 1, the CCD 1 is reset periodically (e.g. every several minutes) until receipt of the external trigger. Specific resetting of the CCD 1 will be described with reference to FIG. 5. FIG. 5 is a diagrammatic view of a potential and a CCD substrate schematically showing a discharge of signal charges for resetting of the CCD.

For example, the substrate of CCD 1, as shown in FIG. 5, has a P-well substrate 22 laminated and formed on an N-well substrate 21, and n+ diffusion layers 23 doped and diffused over the P-well substrate 22. The potential at this time is as shown at the left in FIG. 5. Even if the driving of the CCD 1 is stopped, signal charges Q may be generated by dark current, previous driving of the CCD 1 and so on, which may be present in the n+ diffusion layers 23. Then, the potential is raised to discharge the signal charges present in the n+ diffusion layers 23. In the case of FIG. 5, the potential is raised by increasing the voltage applied to the P-well substrate 22 as shown in a two-dot chain dash in FIG. 5, to discharge the signal charges Q present in the n+ diffusion layers 23. This voltage application to the P-well substrate 22 also is done from the power source 9a.

And in this Embodiment 1, when the event takes place, the occurrence of the event is detected as a trigger, and this external trigger is fed through the control unit 8 to the power source 9a and timing generator 9b. Upon receipt of the external trigger, in synchronism with the trigger, the timing generator 9b, with the synchronized timing, and the power source 9a, by applying voltage to the read gates 14 and transfer electrodes (not shown) of the CCD 1, start driving the CCD 1.

After the driving of the CCD 1 is started, conventionally and in this Embodiment 1 also, the CCD 1 is driven with the photographic cycle $T_2$ of 1.0 μs per frame, which is shorter than the photographic cycle $T_1$ before the occurrence of the event, in order to image in detail a rapid change in the event after the occurrence of the event, as noted hereinbefore. The imaging of the CCD 1 is stopped upon receipt of an external signal concerning stopping of the imaging.

After stopping the imaging, in order for monitoring a post-occurrence of the event, the CCD 1 may be driven again with the photographic cycle $T_1$ of 2.0 μs per second, as shown in FIG. 3, or resetting may be carried out again by stopping the driving of the CCD 1 completely.

According to the method of driving the CCD 1 and the image pickup apparatus described above, when imaging is carried out with the CCD 1 having a plurality of storage CCDs 12, the imaging can be carried out with a short photographic cycle, but the CCD 1 will generate heat easily. Then, when an external trigger is received as the predetermined signal after receiving a signal concerning a start of imaging, the power source 9a and timing generator 9b carry out controls to stop the driving of the CCD 1 from receipt of the signal concerning a start of imaging until receipt of the external trigger, and to start the driving of the CCD 1 synchronously with receipt of the external trigger. Thus, instead of starting the driving of the CCD 1 immediately upon receipt of the signal concerning a start of imaging, the start of the driving of the CCD 1 is delayed by the time from receipt of the signal concerning a start of imaging until receipt of the external trigger. Therefore, the driving time of the CCD 1 can be shortened by the time from receipt of the signal concerning a start of imaging until receipt of the external trigger, thereby suppressing heat generation of the CCD 1.

This invention is useful in "external photography" which stops the driving of the CCD 1 after receipt of an external signal as in this Embodiment 1 (timing chart of FIG. 3). The external signal concerning stopping of the imaging is received after receipt of the external trigger noted above.

In this Embodiment 1, as shown in FIG. 5, the CCD 1 is reset periodically during the stopping of the driving of the CCD 1 from receipt of the above signal concerning a start of imaging until receipt of the above external trigger. Even if the driving of the CCD 1 is stopped, signal charges Q are generated to generate noise by dark current, previous driving of the CCD 1 and so on. Then, noise can be reduced by carrying out resetting periodically to discharge the noise such as of signal charges.

[Embodiment 2]

Figure 6:
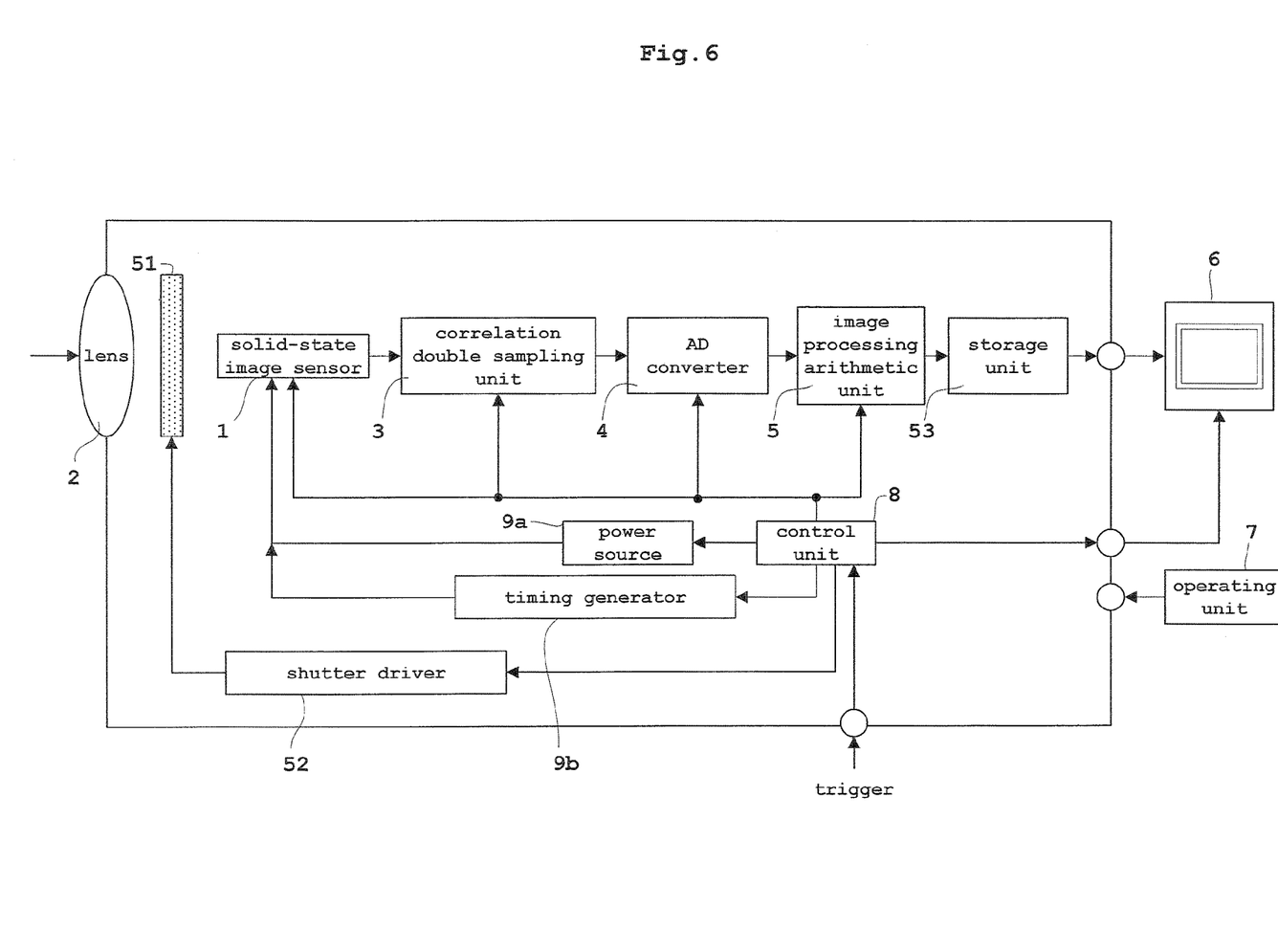
FIG. 6 is a block diagram showing an outline of an image pickup apparatus using a CCD type solid-state image sensor (CCD) according to Embodiment 2.

Next, Embodiment 2 of this invention will be described with reference to the drawings. FIG. 6 is a block diagram showing an outline of an image pickup apparatus using a CCD type solid-state image sensor (CCD) according to Embodiment 2. The following description will be made of this Embodiment 2 also employing the in-situ storage image sensor shown in FIG. 2.

As shown in FIG. 6, a (mechanical) shutter 51, a shutter driver 52 and a storage unit 53 are provided. The shutter 51 shuts off light entering the CCD 1 through the lens 20 The shutter driver 52 drives the shutter 51 to close the shutter 51 to shut off light, or open the shutter 51 so that light may be taken in. The storage unit 53 stores two-dimensional images of the subject having undergone the arithmetic processes by the image processing arithmetic unit 5, and reads the images for output to the screen of monitor 6. In this Embodiment 2, the storage unit 53 has a storage area for predetermined frames (e.g. 100 frames). The storage unit 53 always stores images respectively corresponding to the latest signal charges for the predetermined frames. It should be noted that foregoing Embodiment 1 also has the shutter, shutter driver and storage unit, but these components are omitted from FIG. 1.

Figure 7:
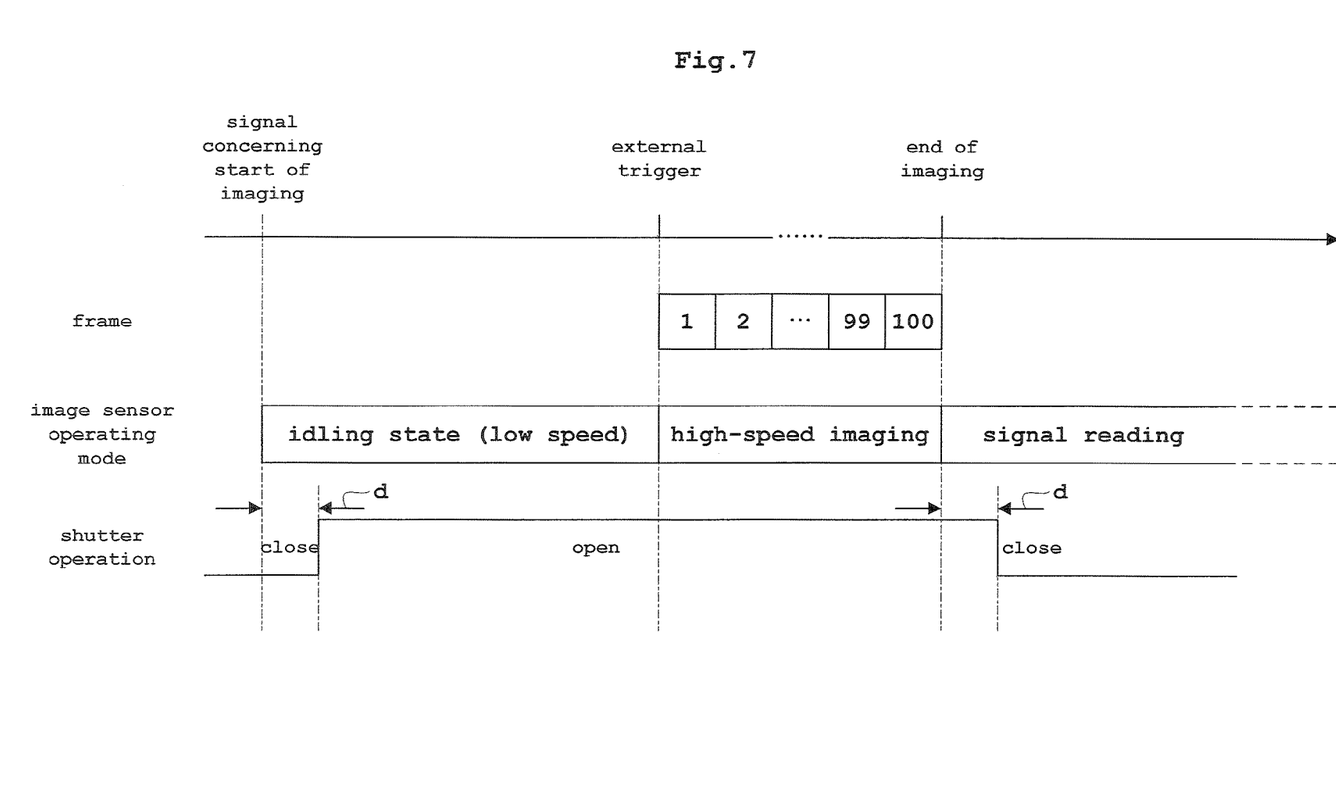
FIG. 7 is a timing chart concerning driving of the CCD according to Embodiment 2.
Figure 8:
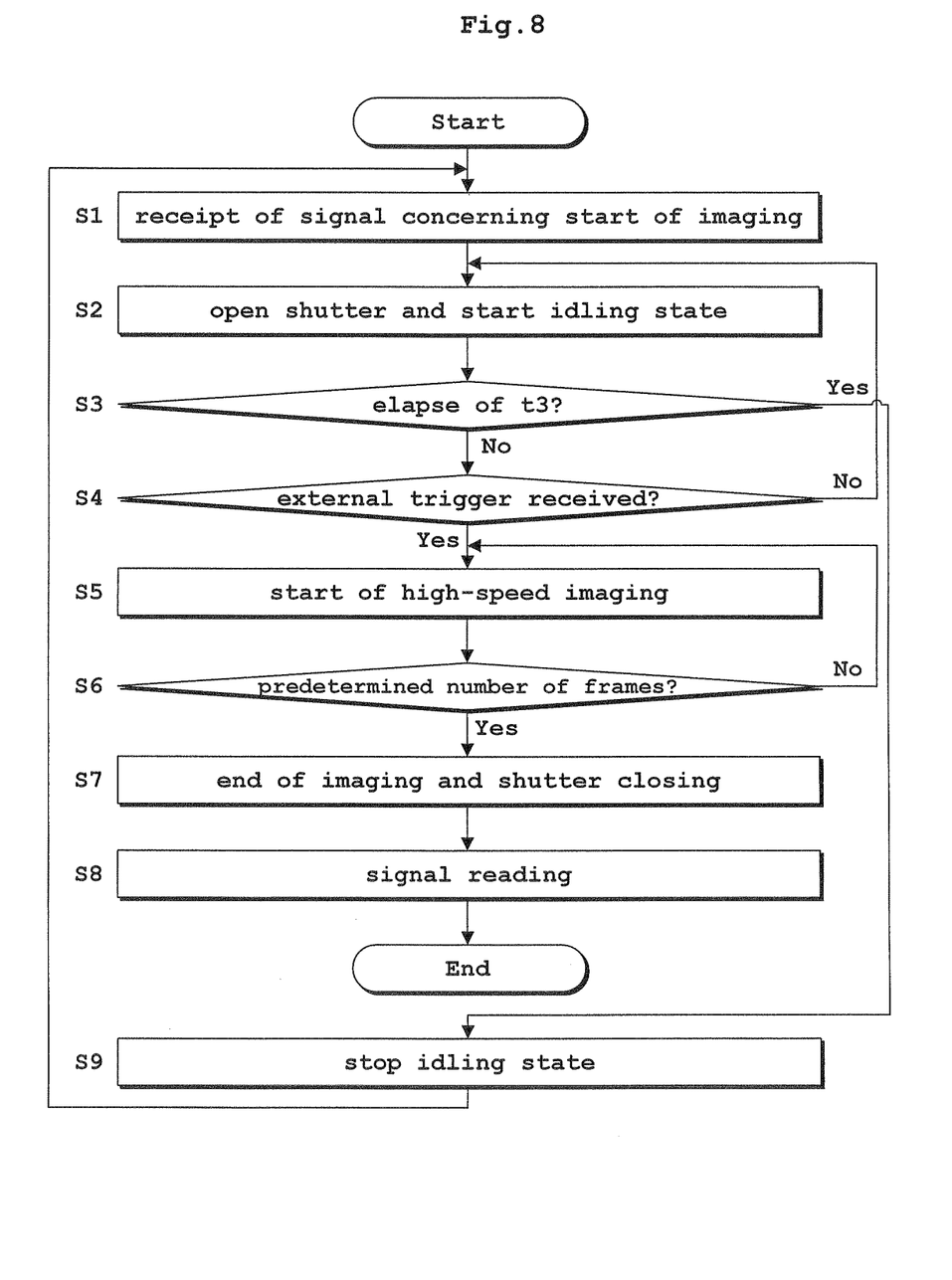
FIG. 8 is a flow chart of an imaging sequence according to Embodiment 2.
Figure 9:
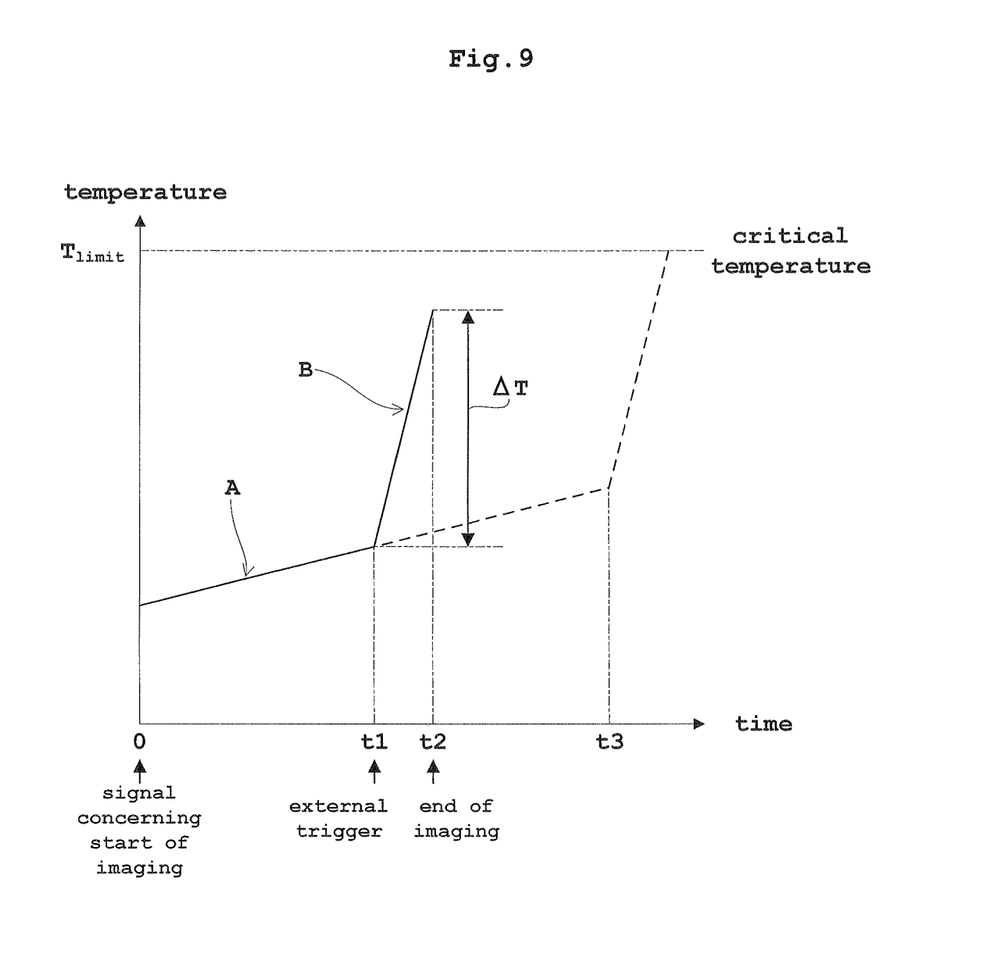
FIG. 9 is a view schematically showing variations in CCD temperature in driving of the CCD according to Embodiment 2.

Next, a specific driving control for the CCD 1 will be described with reference to FIGS. 7-9. FIG. 7 is a timing chart concerning driving of the CCD according to Embodiment 2. FIG. 8 is a flow chart of an imaging sequence according to Embodiment 2. FIG. 9 is a view schematically showing variations in CCD temperature in driving of the CCD according to Embodiment 2.

(Step S1) Receipt of Signal Concerning Start of Imaging

As described also in Embodiment 1, a signal concerning a start of imaging is generated by depressing a photographing button, or a signal concerning a start of imaging is generated from a personal computer or the like present outside the image pickup apparatus. The control unit 8 receives the signal concerning a start of imaging.

(Step S2) Open Shutter and Start Idling State

Upon receipt of the signal concerning a start of imaging, the control unit 8 controls the shutter driver 52 to open the shutter 51. In synchronism with the signal, the timing generator 9b, with the synchronized timing, and the power source 9a, by applying voltage to the read gates 14 and transfer electrodes (not shown) of the CCD 1, start an idling state by driving the CCD 1 at low speed.

When the shutter 51 is opened, incident light (optical image of the subject) will enter the CCD 1 through the lens 2. Under normal circumstances, it is desirable to shut off the incident light in the idling state, but a switching action of the shutter 11 takes a long time compared with the time of high-speed imaging (see d in FIG. 7; d being about 3 ms, for example). Therefore, if the shutter 51 were opened after receipt of the external trigger, there would be a delay in starting exposure to make desired imaging impossible. So, the shutter 51 is opened here when the signal concerning a start of imaging is received.

In the CCD 1 in the idling state, as at a time of normal imaging, signal charges (dummy signals) generated from the photodiodes 11 are stored while being transferred successively to the storage CCDs 12 and further to the vertical transfer CCDs 13. However, at a low-speed time in the idling state, the signal charges from the CCD 1 are not transferred to the horizontal transfer CCD 15, and signal charges that cannot be stored in (held by) the storage CCDs 12 and vertical transfer CCDs 13 for 100 frames are discarded in order from the oldest.

As opposed to foregoing Embodiment 1 which stops the driving of the CCD 1 in the same idling state, this Embodiment 2 drives the CCD 1 at low speed in the idling state, which is done in order to prevent noise due to dark current and the like from accumulating in the photodiodes 11, and the storage CCDs 12, vertical transfer CCDs 13 and so on arranged close to the photodiodes 11 on the device. The transfer rate of the transfer CCDs 12 and vertical transfer CCDs 13 (that is, the photographic rate) in the idling state is set to a sufficiently low rate compared with the transfer rate (photographic rate) at the time of actual imaging. For example, even if the photographic rate at the time of actual imaging is $100 \times 10^6$ frames per second, the photographic rate in the idling state is set to about 30 frames per second of the television rate. This is because a large amount of heat would be generated when the CCD 1 is driven at such a high speed of $100 \times 10^6$ frames per second, and a rapid rise of temperature in the device would not allow a long duration of the idling state. That is, by driving the CCD 1 at a sufficiently low rate in the idling state, an accumulation of noise can be prevented and heat generation suppressed to allow the idling state to continue for a long time.

This photographic rate in the idling state will be described supplementarily with reference to FIG. 9. Assume now that a signal concerning a start of imaging is received at time 0, and the CCD 1 is driven in the idling state (low speed). Then, as indicated by A in FIG. 9, the temperature of the CCD 1 (device temperature) rises relatively slowly. On the other hand, when high-speed imaging is carried out as described hereinafter, the device temperature will rise sharply as indicated by B in FIG. 9. Supposing that the CCD 1 remains undamaged up to a limit temperature (indicated as "critical temperature" in FIG. 9) $T_{limit}$, the device temperature would exceed the limit temperature $T_{limit}$ in a short time if the CCD 1 were driven in the idling state at a photographic rate comparable to that at the time of high-speed imaging immediately after receipt of the signal concerning a start of imaging. On the other hand, the time from receipt of the signal concerning a start of imaging until receipt of an external trigger becomes long by driving the CCD 1 for a low-speed operation in the idling state.

(Step S3) Elapse of t3?

Of course, a generation of heat in the CCD 1 cannot be disregarded altogether since the device temperature rises gently even at the low speed, and therefore a continuable time of the idling state is set beforehand (t3 in FIGS. 8 and 9). When the continuable time t3 elapses, the CCD 1 is controlled to stop the idling state once (step S9). Supposing it is possible to estimate a temperature rise range ΔT for a period from the high-speed imaging synchronized with receipt of the external trigger to the end of imaging in FIG. 9, there is a possibility, when the duration of the idling state exceeds t3, that the device temperature exceeds the limit temperature $T_{limit}$ at the time of the high-speed imaging synchronized with receipt of the external trigger. Thus, the above continuable time can be set to t3. Actually, of course, it is necessary to take into consideration differences in various conditions such as ambient temperature, and thus it is advisable to set the continuable time by considering the severest conditions.

(Step S4) External Trigger Received?

If the occurrence of an event is detected and an external trigger is received before elapse of the continuable time t3 in step S3, the operation proceeds to the following step S5. If the external trigger is not received, the operation returns to step S2 to continue the idling state, and steps S2-S4 are repeated until the external trigger is received. Of course, when the continuable time t3 elapses during this repetition in Step S4, the operation proceeds to step S9 to stop the idling state.

(Step S5) Start of High-speed Imaging

If the external trigger is received in step S4, in synchronism with the signal, the timing generator 9b, with the synchronized timing, and the power source 9a, by applying voltage to the read gates 14 and transfer electrodes (not shown) of the CCD 1, cancel the idling state and start high-speed imaging by driving the CCD 1 at a higher speed than the low speed noted above. Of course, the shutter 51 remains open. When the high-speed imaging is started synchronously with receipt of the external trigger (t1 in FIG. 9), the signal charges generated from the photodiodes 11 according to the intensity of incident light are successively transferred to and stored in the storage CCDs 12 and also in the vertical transfer CCDs 13.

(Step S6) Predetermined Number of Frames?

The operation proceeds to the following step S7 when a signal charge first obtained immediately after the start of high-speed imaging is stored in the last stage (it is the 100th stage here) of the vertical transfer CCDs 13, that is when signal charges for 100 frames are fully stored in the storage CCDs 12 and vertical transfer CCDs 13, respectively, and images for 100 frames have been obtained. If 100 frames which are the predetermined number of frames have not been reached, the operation returns to step S5 to continue the high-speed imaging, and repeat steps S5 and S6 until images for 100 frames are obtained.

(Step S7) End of Imaging and Shutter Closing

The imaging is ended when the predetermined number of frames is reached in step S6. Synchronously therewith, the controller 8 controls the shutter driver 52 to close the shutter 51.

(Step S8) Signal Reading

After the imaging is ended in step S7, the power source 9$a$ applies voltage to the transfer electrodes (not shown) of the horizontal transfer CCD 15 for successively transferring to and storing in the horizontal transfer CCD 15 the signal charges for 100 frames stored in the storage CCDs 12 and vertical transfer CCDs 13, thereby to read the signals. Since this signal reading by the horizontal transfer CCD 15 can be carried out only at low speed as distinct from the storage CCDs 12 and vertical transfer CCDs 13, the reading of the signal charges for 100 frames takes a certain amount of time. On the other hand, the operation for closing the shutter 51 is not carried out very fast, either (see d in FIG. 7; d being about 3 ms). However, the shutter 51 closes during the signal reading, and this can shut off the incident light to the CCD 1 to prevent an increase within the CCD 1.

The image processing arithmetic unit 5 carries out various arithmetic processes on the electric signals resulting from the signal charges amplified to low noise and digitized by the correlation double sampling unit 3 and AD converter 4, to create two-dimensional images of the subject. The two-dimensional images of this subject are written and stored in the storage unit 53. When a predetermined operation is carried out from the operating unit 7, images for 100 frames are read from the storage unit 15 in order, and are sent to the monitor 6. Thus, the images for 100 frames obtained by high-speed imaging can be reproduced in slow motion.

According to the method of driving the CCD 1 and the image pickup apparatus described above, when imaging is carried out with the CCD 1 having a plurality of storage CCDs 12, the imaging can be carried out with a short photographic cycle, but the CCD 1 generates heat easily. Then, when an external trigger is received as a predetermined signal after receipt of a signal concerning a start of imaging, the power source 9$a$ and timing generator 9$b$ control to set an idling state by driving the CCD 1 at low speed from receipt of the signal concerning a start of imaging until receipt of the external trigger, and control to cancel the idling state by driving the CCD 1 at a higher speed than the above low speed in synchronism with receipt of the external trigger. Thus, instead of changing the driving of the CCD 1 to the high speed immediately after receipt of the signal concerning a start of imaging, the high speed for the CCD 1 is delayed by the time from receipt of the signal concerning a start of imaging to receipt of the external trigger. Although drive current is supplied to the CCD 1 at the time of low speed in the idling state, since it is low speed, the heat generation of the CCD 1 is considerably low compared with the time of imaging at high speed. Therefore, the driving time of the CCD 1 can be shortened by the time from receipt of the signal concerning a start of imaging to receipt of the external trigger, thereby suppressing the heat generation of the CCD 1.

At the time of low speed, the photoelectric conversion operation by the photodiodes 11 and the transfer operation of signal charges by the storage CCDs 12 and vertical transfer CCDs 13 are repeatedly carried out. Therefore, noise due to dark current and the like is not accumulated. Images with an excellent signal to noise ratio can be obtained from an actual start of imaging (i.e. after receipt of the external trigger).

This invention is not limited to the foregoing embodiments, but may be modified as follows:

(1) Each of the foregoing embodiments is suitable for high-speed imaging with a photographic rate at 100,000 frames per second or higher. It may be applied to ordinary imaging with a photographic rate at less than 100,000 frames per second.

(2) Each of the foregoing embodiments has been described taking the photodiodes as an example of photoelectric conversion device. However, photogates may be used instead.

(3) Each of the foregoing embodiments has been described taking the "in-situ storage image sensor" with slanted CCDs for example. This invention is applicable also to an image sensor constructed to have storage CCDs in line form arranged vertically, or a storage device constructed of storage CCDs in matrix form.

(4) In foregoing Embodiment 1, the CCD 1 is periodically reset during stopping of the driving of the CCD 1. It is not absolutely necessary to reset the CCD 1 where discharging of noise such as of signal charges need not be considered.

(5) In foregoing Embodiment 1, as shown in the timing chart of FIG. 3, the CCD 1 is driven with photographic cycle $T_1$ at 2.0 μs per frame until receipt of a signal concerning a start of imaging, in order to monitor, before the occurrence of an event, a situation before a change in the event. However, the driving of the CCD 1 may be stopped completely.

(6) In foregoing Embodiment 2, although not specifically stated, before receipt of the signal concerning a start of imaging in the timing chart of FIG. 7, i.e. before the idling state, the CCD 1 may be driven before the idling state as in foregoing Embodiment 1, in order to monitor, before the occurrence of an event, a situation before a change in the event. The driving of the CCD 1 may be stopped completely as in modification (5) above.

(7) In foregoing Embodiment 2, a determination for stopping the idling state is made based only on elapse of continuable time t3 from the start of the idling state. In parallel therewith, control may be used, in which the temperature of the CCD 1 is detected with a temperature sensor, and the idling state is stopped when the temperature reaches a predetermined level or higher.

(8) The flow chart in foregoing Embodiment 2 may be applied to foregoing Embodiment 1. In Embodiment 1, since control is performed for the idling state by stopping the driving of the CCD, there is no need for stopping the idling state based on elapse of continuable time t3 from the start of the idling state as done in Embodiment 2.

(9) In foregoing Embodiment 2, control is performed to end imaging when signal charges corresponding to the predetermined number of frames have been stored in the transfer CCDs 12 and vertical transfer CCDs 13 after canceling the idling state of the CCD1 of CCD1 and starting the imaging synchronously with receipt of the predetermined signal (external trigger). Such control may be applied to Embodiment 1.

The invention claimed is:

1. A method of driving an image sensor having a photoelectric conversion device for converting incident light into electric charges, thereby to generate signal charges corresponding to intensity of the light, and a plurality of charge storage devices for accumulating and storing the signal charges generated from the photoelectric conversion device, imaging being carried out by causing the photoelectric conversion device to generate the signal charges, and successively transferring, while storing, the signal charges from the charge storage devices to adjacent charge storage devices, wherein, when an external trigger is received after receiving a signal generated by depression of an imaging button, control is carried out to maintain voltage applied to read gates and transfer electrodes of the image sensor in an idling state from receipt of the signal generated by depression of the imaging button until receipt of the external trigger, and control is carried out to cancel the idling state of the image sensor by applying voltage to the read gates and the transfer electrodes to successively transfer and store the signal charges from the photoelectric conversion device to the charge storage devices synchronously with the receipt of the external trigger.

2. The method of driving the image sensor according to claim 1, wherein the idling state is to stop driving of the image sensor, and the cancellation of the idling state is to start driving of the image sensor, controls being carried out to stop driving of the image sensor from receipt of the signal generated by depression of the imaging button until receipt of the external trigger, and to start driving of the image sensor synchronously with the receipt of the external trigger.

3. The method of driving the image sensor according to claim 2, wherein the image sensor is reset periodically during stopping of driving of the image sensor from receipt of the signal generated by depression of the imaging button until receipt of the external trigger.

4. The method of driving the image sensor according to claim 1, wherein the idling state is to set driving of the image sensor to a low speed, and the cancellation of the idling state is to set driving of the image sensor to a higher speed than the low speed, controls being carried out to set driving of the image sensor to the low speed from the receipt of the signal generated by depression of an imaging button until the receipt of the external trigger, and to set driving of the image sensor to the higher speed synchronously with the receipt of the external trigger.

5. The method of driving the image sensor according to claim 1. wherein control is carried out to end the imaging when signal charges corresponding to a predetermined number of frames have been stored in the charge storage devices, after starting the imaging by canceling the idling state of the driving device of the image sensor synchronously with the receipt of the external trigger.

6. An image pickup apparatus comprising an image sensor having a photoelectric conversion device for converting incident light into electric charges, thereby to generate signal charges corresponding to intensity of the light and a plurality of charge storage devices for accumulating and storing the signal charges generated from the photoelectric conversion device, imaging being carried out by causing the photoelectric conversion device to generate the signal charges, and successively transferring, while storing, the signal charges from the charge storage devices to adjacent charge storage devices; and an image sensor control device for controlling driving of the image sensor; wherein the image sensor control device is arranged, when an external trigger is received after receiving, a signal generated by depression of an imaging button, to carry out control to maintain voltage applied to read gates and transfer electrodes of the image sensor in an idling state from receipt of the signal generated by depression of an imaging button until receipt of the external trigger, and to carry out control to cancel the idling state of the image sensor by applying voltage to the read gates and the transfer electrodes to successively transfer and store the signal charges from the photoelectric conversion device to the charge storage devices synchronously with the receipt of the external trigger.

7. The image pickup apparatus according to claim 6, wherein the idling state is to stop driving of the image sensor, and the cancellation of the idling state is to start driving of the image sensor, the image sensor control device being arranged to carry out controls to stop driving of the image sensor from receipt of the signal generated by depression of the imaging button until receipt of the external trigger, and to start driving of the image sensor synchronously with the receipt of the external trigger.

8. The image pickup apparatus according to claim 7, wherein the image sensor control device is arranged to reset the image sensor periodically during stopping of driving of the image sensor from receipt of the signal generated by depression of the imaging button until receipt of the external trigger.

9. The image pickup apparatus according to claim 6, wherein the idling state is to set driving of the image sensor to a low speed, and the cancellation of the idling state is to set driving of the image sensor to a higher speed than the low speed, the image sensor control device being arranged to carry out controls to set driving of the image sensor to the low speed from receipt of the signal generated by depression of an imaging button until receipt of the external trigger, and to set driving of the image sensor to the higher speed synchronously with the receipt of the external trigger.

10. The image pickup apparatus according to claim 6, wherein the image sensor control device is arranged to carry out control to end the imaging when signal charges corresponding to a predetermined number of frames have been stored in the charge storage devices, after starting the imaging by canceling the idling state of the driving device of the image sensor synchronously with the receipt of the external trigger.

* * * * *